(12) United States Patent
Sunouchi et al.

(10) Patent No.: US 8,518,520 B2
(45) Date of Patent: Aug. 27, 2013

(54) FILM AND METHOD OF FILM PROCESSING

(75) Inventors: Daisuke Sunouchi, Kanagawa (JP);
Yukihisa Hoshino, Kanagawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 351 days.

(21) Appl. No.: 12/991,100

(22) PCT Filed: Mar. 9, 2009

(86) PCT No.: PCT/JP2009/054383
§ 371 (c)(1),
(2), (4) Date: Nov. 4, 2010

(87) PCT Pub. No.: WO2009/142048
PCT Pub. Date: Nov. 26, 2009

(65) Prior Publication Data
US 2011/0052873 A1    Mar. 3, 2011

(30) Foreign Application Priority Data

May 19, 2008  (JP) .................................. 2008-130708
Jul. 24, 2008  (JP) .................................. 2008-190689

(51) Int. Cl.
*B32B 3/00* (2006.01)

(52) U.S. Cl.
USPC ......................................... 428/156; 428/141

(58) Field of Classification Search
USPC ................ 428/40.1, 156, 167, 172, 343, 354, 428/141
See application file for complete search history.

(56) References Cited

U.S. PATENT DOCUMENTS

| 4,410,582 A * | 10/1983 | Tsunashima et al. ......... 428/212 |
| 2005/0074579 A1* | 4/2005 | Suzuki et al. ................. 428/141 |

FOREIGN PATENT DOCUMENTS

| JP | 57057770 A | * | 4/1982 |
| JP | 6-285978 A |  | 10/1994 |
| JP | 2000-328013 A |  | 11/2000 |
| JP | 2002-36406 A |  | 2/2002 |
| JP | 2002-52843 A |  | 2/2002 |
| JP | 2003-190075 A |  | 7/2003 |
| JP | 2003-240904 A |  | 8/2003 |
| JP | 2006-22193 A |  | 1/2006 |
| JP | 2006-189784 A |  | 7/2006 |
| JP | 2007-100000 A |  | 4/2007 |

OTHER PUBLICATIONS

International Search Report for PCT/JP2009/054383 mailed May 26, 2009.

* cited by examiner

*Primary Examiner* — Catherine A Simone
(74) *Attorney, Agent, or Firm* — Roberts Mlotkowski Safran & Cole, P.C.

(57) ABSTRACT

To provide a film superior in hand tearability and linear cutting efficiency that can be produced without need for a complicated blending of resin raw materials and high-grade processing facilities. There is provided a film having an average distance between the local apexes in any one direction of 8 μm or less.

4 Claims, 3 Drawing Sheets

FILM AND METHOD OF FILM PROCESSING

TECHNICAL FIELD

The present invention relates to a film and a method of film processing. More specifically, it relates to a film superior in hand tearability, a method of film processing for preparing the same, and a laminate and an adhesive tape containing the film.

BACKGROUND ART

It is often difficult to tear a film by hand because of necking and elongation during tearing. For improvement of the hand tearability of film, a cut or a notch such as V notch, is often formed on the film.

Patent Document 1, for example, discloses as the hand-tearable film a porous polyolefin resin film obtained by drawing a film of a polyolefin resin blended with filler crosswise monoaxially. The porous polyolefin resin film is said to be superior in hand tearability in one direction.

Alternatively, Patent Document 2 discloses a polyamide-based heat-shrinkable film containing an aliphatic polyamide polymer and an aromatic polyamide polymer that has a particular linear cutting efficiency, hot water shrinkage rate and variability in thickness. The polyamide-based heat-shrinkable film is said to be superior in linear cutting efficiency.

[Patent Document 1] Japanese Unexamined Patent Application Publication No. 2002-52843

[Patent Document 2] Japanese Unexamined Patent Application Publication No. 2007-100000

DISCLOSURE OF THE INVENTION

Technical Problems to be Solved

The porous polyolefin resin film disclosed in Patent Document 1 and the polyamide-based heat-shrinkable film disclosed in Patent Document 2 are both superior in hand tearability and linear cutting efficiency in one direction. However, these films demand complicated blending of resin raw materials.

A major object of the present invention is to provide a film superior in hand tearability and linear cutting efficiency that can be produced without need for a complicated blending of resin raw materials and high-grade processing facilities.

Means to Solve the Problems

The present invention, which solved the problems above, provides a film having an average distance between the local apexes in any one direction of 8 μm or less.

Favorably in the film, the difference between the average distances between local apexes in any one direction and in the direction perpendicular thereto is 2 μm or more.

The present invention also provides an adhesive tape having the film and an adhesive layer formed at least on one side thereof, a laminate having the film, and an adhesive tape having the laminate and an adhesive layer formed at least on one side thereof.

The present invention also provides a method of film processing of processing a film, comprising providing the surface of the film with a particular surface roughness, by adjusting the temperature of a pressure roll carrying a rough-textured design so as to control the storage modulus of the resulting film in the range of $1 \times 10^8$ to $1 \times 10^{10}$ Pa and feeding the film to the pressure roll under a linear pressure of 5 to 300 kg/cm.

The "average distance between local apexes", as used in the present invention, is a parameter indicating the degree of film surface roughness. The average distance between local apexes can be determined by a method in accordance with JIS B0601. The average distance between local apexes is the value obtained by sampling a partial region of a roughness curve corresponding to a standard length l in the direction of the average line, determining the lengths of the average line corresponding to neighboring local apexes, and averaging the multiple lengths between local apexes. The local apex is an apex of protuberance in the roughness curve where the slope of the tangent line of the roughness curve changes from positive to negative. During actual analysis, the local apex is a point where the differential value of the roughness curve changes from positive to negative. The average distance between local apexes is normally expressed with millimeter (mm) unit, but in the present invention, it will be expressed by micrometer (μm). The "difference between the average distances between local apexes" in the present invention is the absolute value of the difference between the average distances between the local apexes in any one direction and in the other direction.

The "storage modulus" is used as a parameter indicating film elasticity and the storage modulus can be determined by a method in accordance with JIS K-7244. The storage modulus is a value indicating the magnitude of the energy when a stress applied is stored and dissipated completely.

Effect Of The Invention

The present invention provides a film superior in hand tearability and linear cutting efficiency that can be produced without need for complicated blending of resin raw materials and high-grade processing facilities.

BEST MODE FOR CARRYING OUT THE INVENTION

Figure 1:
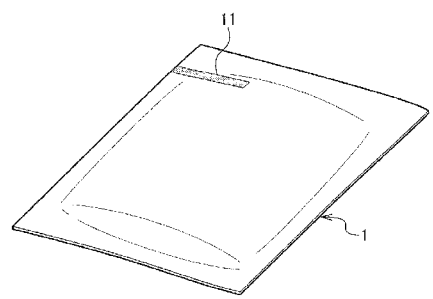
FIG. 1 is a view illustrating the film in the first embodiment of the present invention.

Hereinafter, favorable embodiment of the present invention will be described with reference to drawings. The embodiments below are only typical embodiments of the present invention, and it should be understood that the scope of the present invention is not limited by these embodiments.

1. Film (1) Average Distance Between Local Apexes

The film according to the present invention is characterized in that the average distance between the local apexes of surface roughness at least of one-sided surface thereof in any one direction is 8 μm or less. When the film according to the present invention is the intermediate layer contained in a laminate, the film surface is the surface before lamination.

The average distance between the local apexes in any one direction (direction A) is preferably 8 µm or less, more preferably 7 µm or less and still more preferably 6 µm or less. It is possible to obtain a film superior in hand tearability in the direction A, by controlling the average distance between the local apexes in the numeric range above, because there are a greater number of sites for stress concentration during hand tearing. Alternatively when the average distance between the local apexes is exceeded 8 µm, the hand tearability of the film declines, because there are a smaller number of sites for stress concentration during hand tearing.

In relation to the average distance between local apexes, the difference between the average distance between the local apexes in any one direction (direction A) and that in the direction perpendicular thereto (direction B) is 2 µm or more, preferably 10 µm or more and more preferably 20 µm or more. When the average distances between the local apexes in two directions perpendicular to each other are in the numeric range above, stress concentration occurs in the direction where the average distance between the local apexes is smaller, thus giving a film anisotropic in hand tearability and superior in linear cutting efficiency in the direction A of the film.

The average distance between local apexes can be calculated from a film surface roughness curve, as determined by a method in accordance with JIS B 0601. The roughness curve can be measured by a known method, for example by observation of the film by using a ultra-deep profiling microscope using laser beam. The ultra-deep profiling microscope allows direct observation of film samples by using laser beam, and analysis of a roughness curve by measurement of the three-dimensional shape of a highly irregular-surfaced object.

(2) Material

The term "film" in the present invention means a thin sheet-shaped article having a thickness extremely smaller compared to its surface area, and the films according to the present invention include so-called "sheets" and "webs". The film and the sheet are differentiated from each other normally by thickness, and thinner materials are called films and the thicker materials sheets. The webs are those that are soft and have a length extremely longer than the width.

The material for the film is not particularly limited, and examples of favorable materials include at least one polyolefin resins selected from low-density polyethylenes, medium-density polyethylenes, high-density polyethylenes, straight-chain low-density polyethylenes, ethylene-α-olefin copolymers, polypropylenes (including homopolymers, random polymers and block polymers), propylene-α-olefin copolymers, ethylene-vinyl acetate copolymers and others; polyester resins such as polyethylene terephthalate, polybutylene terephthalate and polyethylene naphthalate; polyamide resins; polyvinyl chloride resins; vinylidene chloride resins; polystyrene resins; methacrylic resins; polyvinyl alcohol resins; polyvinylidene chlorides or the copolymers thereof; mixtures of a polyvinylidene fluoride resin; a polyvinylidene fluoride resin and a PMMA resin; and cellophane. Polyolefin resins are preferable, and polyethylene resins are particularly preferable among the resins above. These resin components may be used alone or as a mixture of two or more.

The resin components for the film may additionally contain as needed known colorants, ultraviolet absorbents, stabilizers, lubricants, fillers and others, as they are blended, in the range that does not impair the advantageous effects of the present invention.

The thickness of the film may be set as appropriate depending on applications, but preferably 10 to 200 µm, more preferably 15 to 150 µm.

2. Laminate

The laminate according to the present invention comprise the film above, and may be a laminate of the film above with another film, sheet, a paper or a metal foil such as of aluminum or the like, which is formed by lamination methods such as wet lamination, dry lamination, non-solvent lamination, extrusion lamination or thermal lamination. The film above may be contained in the laminate as the (front or rear) surface layer or as the intermediate layer.

3. Adhesive Tape

The adhesive tape according to the present invention is prepared by forming an adhesive layer at least on one side of the film or laminate and cutting the resulting film or laminate to a desired tape width. The adhesive layer can be prepared by using an adhesive commonly used, for example by coating a rubber-based adhesive, an acrylic adhesive, a silicone-based adhesive or a urethane-based adhesive on the surface of the film or the like. These adhesives may contain, as needed, tackifiers, aging inhibitors, curing agents and others for desired adhesion properties.

Coating of the adhesive is not particularly limited and, for example, can be carried out by using a gravure roll coater, a reverse roll coater, a kiss roll coater, a dip roll coater, a bar coater, a knife coater or a spray coater. The thickness of the adhesive layer after drying is preferably in the range of 10 to 80 µm, more preferably in the range of 15 to 65 µm. A thickness of under 10 µm may lead to deterioration in adhesive power of the resulting adhesive tape. Alternatively, a thickness of exceed 80 µm may result in coating of the adhesive in an amount more than needed, which it unfavorable from the viewpoint of cost.

4. Method of Film Processing (1) Control of the Average Distance Between Local Apexes The film according to the present invention can be produced, for example, by molding a resin extruded out of a T die into the shape of sheet and drawing the resulting film. In addition to the method above, various molding methods including calendering, casting, inflation molding, solution casting, and solubilization in solvent and subsequent cast molding can be used for the molding.

The film surface roughness, specifically the average distances between the local apexes in any one direction and/or the direction perpendicular thereto, can be controlled in the condition described above, for example, by the following method: A film is first prepared by molding and then fed under a heated pressure roll (emboss roll) having an embossing design (embossing pattern), to make the film irregularly surfaced. Then, the film is drawn, to make the formed irregularity anisotropic. In this way, the distance between local apexes increases in the drawing direction and decreases in the direction perpendicular to the drawing direction, and it is thus possible to control the average distance between local apexes in the desired condition.

The roughness of the embossing pattern on the emboss roll may be selected properly according to the surface roughness of the molded sheet and the sheet drawing rate. For example when the film drawing rate is 4 times, the distance between the protrusions in the film-drawing direction may be controlled to be 2 µm or less and the distance between the protrusions in the direction perpendicular to the film-drawing direction to be 10 µm or less.

The storage modulus of the film during passage under the emboss roll is regulated in the range of preferably $1 \times 10^8$ to $10^{10}$ Pa, more preferably $1.5 \times 10^8$ to $7.5 \times 10^9$ Pa and still more preferably $2\times10^8$ to $5\times10^9$ Pa. When the storage modulus is regulated in the numeric range above, the film can be processed without adhesion to the emboss roll and also without need for a complicated blending or processing facility. The storage modulus can be determined by a method in accordance with JIS K-7244.

The roll linear pressure of the emboss roll during passage of the film is preferably 5 to 300 kg/cm, more preferably 10 to 200 kg/cm and still more preferably 15 kg/cm to 150 kg/cm. It is possible to form a rough-textured surface that provides the film with favorable hand tearability by regulating the roll linear pressure in the numeric range above.

The roll linear pressure can be calculated from the radius of the air cylinder pressing the emboss roll, the number of air cylinders, the air pressure and the width of the web, according to the following Formula:

Roll linear pressure (kg/cm)=(Air cylinder radius (cm))$^2\times3.14\times$Air cylinder number$\times$Air pressure (kg/cm$^2$)/Film width (cm)

(2) Rough-Textured Region

The rate of the area of the rough-textured region on the film surface is in the range of 1 to 100%, preferably 5 to 100% in the entire film surface area. Here, a film surface area of 1% corresponds to a state in which a rough-textured design is formed in the area at a rate of 1% of the entire film. Alternatively, a film surface area of 100% corresponds to a state in which the rough-textured design is formed on the entire film.

The shape of the rough-textured surface formed on the film is advantageously triangular, and the depth of the rough-textured surface is preferably deeper, because stress concentration occurs there.

Figure 2:
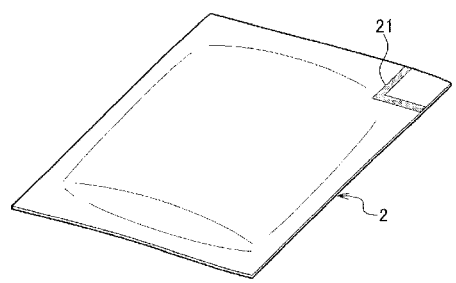
FIG. 2 is a view illustrating the film in the second embodiment of the present invention.
Figure 3:
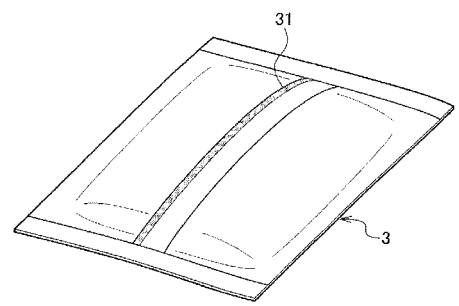
FIG. 3 is a view illustrating the film in the third embodiment of the present invention.

The rough-textured surface can be formed continuously by roll processing, and it is possible for example to make a bag made of film easily tearable by forming a rough-textured surface at a position on one side of the film, for example as shown in FIG. 1, or to make it tearable in the shape of character L by forming a rough-textured surface line lengthwise and widthwise at a corner of film, for example as shown in FIG. 2. It is also possible, for example as shown in FIG. 3, to make a pillow bag of film or the like easily tearable by forming a rough-textured surface in a partial region of the backlining.

The pressure roll used in the method of film processing according to the present invention may have a configuration consisting of two rolls, a roll (emboss roll) with a rough-textured design (embossing pattern) and a backing roll. In such a case, the roughness of the embossing pattern formed on the emboss roll is selected properly according to the surface roughness of the molded sheet and the drawing rate of the sheet, as described above. In addition in the method of film processing according to the present invention, the backing roll may also have an embossing pattern formed thereon. Alternatively, the number of the rolls may be increased, and a surface of film may be processed with two pressure rolls and then the other surface with other pressure rolls.

EXAMPLES

1. Examination of Average Distance Between Local Apexes

First in Examples 1 to 3 and Comparative Examples 1 to 5, the relationship between the average distance between the local apexes and the hand tearability or the linear cutting efficiency of the film was evaluated. The evaluation was made by the following method:

(1) Measurement of the Average Distance Between Local Apexes

The average distance was determined under the condition below, by using a ultra-deep profiling microscope (VK-8510) and VK profile analysis application software (version 1.06) manufactured by KEYENCE CORPORATION. Measurement was repeated thrice or more, and the average of the observed values was calculated.

Figure 4:
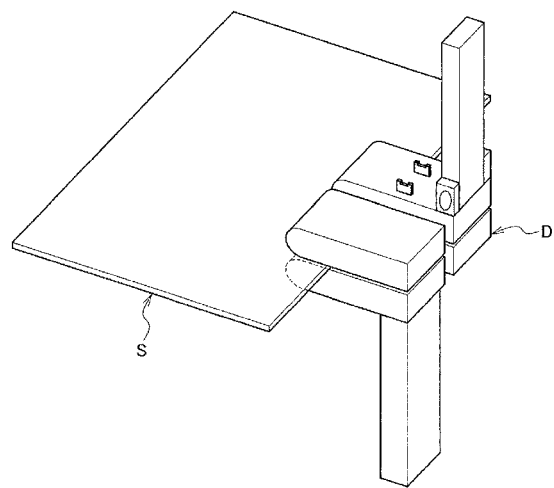
FIG. 4 is a view illustrating a jig used for evaluation of the hand tearability in Examples.

(A) Magnification: 1000 times (20×50 lens)
(B) Microscopic observation condition (gain: 645, offset: 1569, pitch: 0.01 µm)
(C) Observation scale: 550 µm×550 µm (2) Evaluation of Hand Tearability In a test chamber previously adjusted to a temperature of 23±2° C. and a humidity of 50±5% RH, a test film cut to a size of 100 mm square was held in the region within 20 mm from the edge in the cutting direction by jig shown in FIG. 4 with a rubber having a hardness of HDA70, as determined by the durometer hardness test method in accordance with JIS K7215, and a thickness of 3 mm and torn by a tensile test machine (Autograph AGS-500A, manufactured by Shimadzu Corporation). The distance between the jigs was 15 mm then. The strength at break was measured thrice or more, and the average was calculated and evaluated in accordance with the following criteria:

Superior: tensile breaking strength: less than 50 MPa
Favorable: tensile breaking strength: 50 MPa or more and less than 60 MPa
Good: tensile breaking strength: 60 MPa or more and less than 70 MPa
Unfavorable: tensile breaking strength: more than 70 MPa (3) Organoleptic Evaluation of Hand Tearability In a test chamber previously adjusted to a temperature of 23±2° C. and a humidity of 50±5% RH, a film to be tested was held with the left hand and withdrawn to a suitable length with the right hand, and the film was cut with the left hand, and the appearance of the cut surface of the film was examined by visual observation and evaluated according to the following criteria:

Favorable: easily cut
Good: cut, although with slight elongation
Unfavorable: elongated and could not be cut (4) Organoleptic Evaluation of Linear Cutting Efficiency In a test chamber previously adjusted to a temperature of 23±2° C. and a humidity of 50±5% RH, a film to be tested was torn, and the appearance of the film in the tearing direction was examined by visual observation and evaluated in accordance with the following criteria:

Favorable: cut almost linearly in the tearing direction
Good: cut, but not in the tearing direction
Unfavorable: cut almost non-linearly Example 1

A high-density polyethylene (HY430, produced by Japan Polyethylene Corporation) was supplied into a 90-mm uniaxial extruder manufactured by TOSHIBA MACHINE CO., LTD. and melt-extruded at 230° C. through a T die, and the resulting extrudate was cooled and rolled at a roll temperature of 30° C., to give a film having a thickness of 400 µm. The film was processed with a pressure roll carrying a rough-textured design having an local apex distance of 10 µm both in the flow direction and in the direction perpendicular thereto (heating temperature: 120° C.) and then drawn 16 times uniaxially in the crosswise direction in a tenter at 120° C., to give a film having a thickness of 25 µm.

Evaluation results of the film obtained are summarized in "Table 1". The average distance between the local apexes in any one direction (direction A) was 5.7 μm, while the average distance between the local apexes in the direction perpendicular thereto (direction B) was 13.0 μm, and the difference was 7.3 μm. Both the hand tearability and the linear cutting efficiency thereof were "superior" after evaluation. The tensile breaking strength thereof was 35 MPa.

It was found after evaluation of the film obtained that the average distance between the local apexes in the direction A was 9.4 μm, while the average distance between the local apexes in the direction B was 10.8 μm, and the difference (absolute value) was 1.4 μm. Both the hand tearability and the linear cutting efficiency thereof were "unfavorable" after evaluation. The tensile breaking strength thereof was 75 MPa.

TABLE 1

|  |  | Example | | | Comparative Example | | | | |
| --- | --- | --- | --- | --- | --- | --- | --- | --- | --- |
| Drawing rate | Times | 1<br>16.0 | 2<br>12.0 | 3<br>8.0 | 1<br>5.0 | 2<br>3.0 | 3<br>12.0 | 4<br>8.0 | 5<br>3.0 |
| Local apex distance of emboss roll | μm |  | 10.0 |  | 10.0 |  |  |  | — |
| Average distance between local apexes in any one direction (A) | μm | 5.7 | 6.3 | 7.8 | 9.4 | 10.3 | 9.0 | 9.5 | 10.2 |
| Average distance between local apexes in direction perpendicular to direction (B) | μm | 13.0 | 12.3 | 11.1 | 10.8 | 10.5 | 10.8 | 10.6 | 10.5 |
| Difference: (A)-(B) | μm | 7.3 | 6.0 | 3.3 | 1.4 | 0.2 | 1.8 | 1.1 | 0.3 |
| Hand tearability | — | Superior | Superior | Favorable | Unfavorable | Unfavorable | Good | Unfavorable | Unfavorable |
| Organoleptic evaluation of hand tearability | — | Superior | Superior | Favorable | Unfavorable | Unfavorable | Good | Unfavorable | Unfavorable |
| Organoleptic evaluation of linear cutting efficiency | — | Superior | Superior | Superior | Unfavorable | Unfavorable | Good | Unfavorable | Unfavorable |

Example 2

A film having a thickness of 25 μm was prepared in a manner similar to Example 1, except that the thickness of the film after extrusion out of the T die was 300 μm and the drawing rate was 12 times.

It was found after evaluation of the film obtained that the average distance between the local apexes in the direction A was 6.3 μm, while the average distance between the local apexes in the direction B was 12.3 μm, and the difference was 6.0 μm. Both the hand tearability and the linear cutting efficiency thereof were "superior" after evaluation. The tensile breaking strength thereof was 37 MPa.

Example 3

A film having a thickness of 25 μm was prepared in a manner similar to Example 1, except that the thickness of the film after extrusion out of the T die was 200 μm and the drawing rate was 8 times.

It was found after evaluation of the film obtained that the average distance between the local apexes in the direction A was 7.8 μm, while the average distance between the local apexes in the direction B was 11.1 μm, and the difference was 3.3 μm. The hand tearability was "favorable" after evaluation and the linear cutting efficiency "superior". The tensile breaking strength thereof was 56 MPa.

Comparative Example 1

A film having a thickness of 25 μm was prepared in a manner similar to Example 1, except that the thickness of the film after extrusion out of the T die was 125 μm and the drawing rate was 5 times.

Comparative Example 2

A film having a thickness of 25 μm was prepared in a manner similar to Example 1, except that the thickness of the film after extrusion out of the T die was 75 μm and the drawing rate was 3 times.

It was found after evaluation of the film obtained that the average distance between the local apexes in the direction A was 10.3 μm, while the average distance between the local apexes in the direction B was 10.5 μm, and the difference (absolute value) was 0.2 μm. Both the hand tearability and the linear cutting efficiency thereof were "unfavorable" after evaluation. The tensile breaking strength thereof was 97 MPa.

Comparative Example 3

A film having a thickness of 25 μm was prepared in a manner similar to Example 1, except that the thickness of the film after extrusion out of the T die was 300 μm and the film was drawn 12 times without processing under a pressure roll having a rough-textured design.

It was found after evaluation of the film obtained that the average distance between the local apexes in the direction A was 9.0 μm, while the average distance between the local apexes in the direction B was 10.8 μm, and the difference (absolute value) was 1.8 μm. Both the hand tearability and the linear cutting efficiency thereof were "good" after evaluation. The tensile breaking strength thereof was 68 MPa.

Comparative Example 4

A film having a thickness of 25 μm was prepared in a manner similar to Example 1, except that the thickness of the film after extrusion out of the T die was 200 μm and the film was drawn 8 times without processing under a pressure roll having a rough-textured design.

It was found after evaluation of the film obtained that the average distance between the local apexes in the direction A was 9.5 μm, while the average distance between the local apexes in the direction B was 10.6 μm, and the difference (absolute value) was 1.1 μm. Both the hand tearability and the linear cutting efficiency thereof were "unfavorable" after evaluation. The tensile breaking strength thereof was 79 MPa.

Comparative Example 5

A film having a thickness of 25 μm was prepared in a manner similar to Example 1, except that the thickness of the film after extrusion out of the T die was 75 μm and the film was drawn 3 times without processing under a pressure roll having a rough-textured design.

It was found after evaluation of the film obtained that the average distance between the local apexes in the direction A was 10.2 μm, while the average distance between the local apexes in the direction B was 10.5 μm, and the difference (absolute value) was 0.3 μm. Both the hand tearability and the linear cutting efficiency thereof were "unfavorable" after evaluation. The tensile breaking strength thereof was 95 MPa.
2. Evaluation of the Influence of Roll Temperature, Film Storage Modulus and Roll Linear Pressure Subsequently in Examples 4 to 11 and Comparative Examples 6 to 9, influence of the roll temperature, the film storage modulus and the roll linear pressure during film processing on the hand tearability (Examples 4 to 11) and the linear cutting efficiency (Examples 8 to 11) of the film was evaluated. The storage modulus was determined in the following manner:
(1) Measurement of Storage Modulus The storage modulus was determined by a method similar to that of JIS K-7244 by using a dynamic viscoelasticity-evaluating instrument (DMS6100) manufactured by Seiko Instruments Inc., under the following condition:
(A) Measurement mode: tensile mode
(B) Frequency: 1 Hz
(C) Chuck distance: 5 mm
(D) Sample width: 5 mm
(E) Heating rate: 3° C./min
(F) Measurement temperature range: 30 to 200° C.

Example 4

Figure 5:
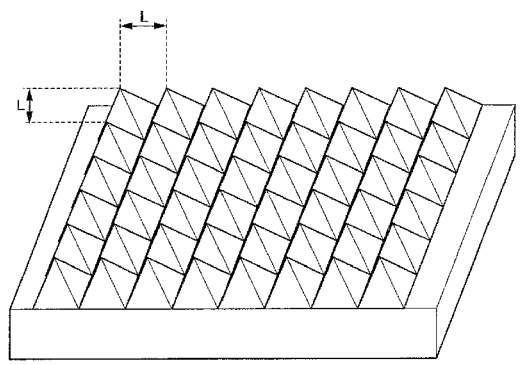
FIG. 5 is a view illustrating an embossing pattern of the pressure roll carrying a rough-textured design used in Examples 4 to 7.

A polyethylene film produced by TAMAPOLY CO., LTD. (trade name: LC-2) was fed into the slit between two pressure rolls previously adjusted to a temperature of 30° C. and a linear pressure of 10 kg/cm. The pressure rolls each carrying a rough-textured design having a local apex distance L of 5 μm both in the flow direction and in the direction perpendicular thereto (see FIG. 5) were used, and the entire film surface area was embossed.

Evaluation results of the film obtained are summarized in "Table 2". The film storage modulus at a temperature of 30° C. was $3.3 \times 10^8$ Pa. The average distance between the local apexes of the film after processing in any one direction (direction A) was 5.3 μm, while the average distance between the local apexes in the direction perpendicular thereto (direction B) was 5.2 μm, and the difference was 0.1 μm. The hand tearability thereof was "superior" or "favorable" after evaluation. The tensile breaking strength thereof was 48 MPa.

TABLE 2

|  |  | Example | | | |
|---|---|---|---|---|---|
|  |  | 4 | 5 | 6 | 7 |
| Film | — | LC-2 | Pylen-OT | Emblem | Emblet PC |
| Storage modulus | Pa | $3.3 \times 10^8$ | $8.8 \times 10^8$ | $4.2 \times 10^9$ | $2.8 \times 10^9$ |
| Roll temperature | ° C. | 30 | 70 | 80 | 80 |
| Roll linear pressure | kg/cm | 10 | 10 | 100 | 200 |
| Average distance between local apexes in any one direction (A) | μm | 5.3 | 5.3 | 5.4 | 5.2 |
| Average distance between local apexes in direction perpendicular to direction (B) | μm | 5.2 | 5.5 | 5.3 | 5.3 |
| Difference: (A)-(B) | μm | 0.1 | 0.2 | 0.1 | 0.1 |
| Hand tearability | — | Superior | Superior | Superior | Superior |
| Organoleptic evaluation of hand tearability | — | Favorable | Favorable | Favorable | Favorable |

Example 5

A film was embossed in a manner similar to Example 1, except that a biaxially drawn polypropylene film produced by TOYOBO CO., LTD. (trade name: Pylen OT P4748) was fed into the slit between two pressure rolls heated to a temperature of 70° C.

It was found after evaluation of the film obtained that the film storage modulus at a temperature of 70° C. was $8.8 \times 10^8$ Pa. The average distance between the local apexes of the film after processing in the direction A was 5.3 μm, while the average distance between the local apexes in the direction B was 5.5 μm, and the difference (absolute value) was 0.2 μm. The hand tearability thereof was "superior" or "favorable" after evaluation. The tensile breaking strength thereof was 46 MPa.

Example 6

A film was embossed in a manner similar to Example 1, except that a nylon film produced by UNITIKA LTD. (trade name: Emblem ON) was fed into the slit between two pressure rolls heated to a temperature of 80° C.

It was found after evaluation of the film obtained that the film storage modulus at a temperature of 80° C. was $4.2 \times 10^9$ Pa. The average distance between the local apexes of the film after processing in the direction A was 5.4 μm, while the average distance between the local apexes in the direction B was 5.3 μm, and the difference was 0.1 μm. The hand tearability thereof was "superior" or "favorable" after evaluation. The tensile breaking strength thereof was 42 MPa.

Example 7

A film was embossed in a manner similar to Example 1, except that a PET film produced by UNITIKA LTD. (trade name: Emblet PC) was fed into the slit between two pressure rolls heated to a temperature of 80° C.

It was found after evaluation of the film obtained that the film storage modulus at a temperature of 80° C. was $2.8 \times 10^9$ Pa. The average distance between the local apexes of the film after processing in the direction A was 5.2 μm, while the average distance between the local apexes in the direction B was 5.3 μm, and the difference (absolute value) was 0.1 μm. The hand tearability thereof was "superior" or "favorable" after evaluation. The tensile breaking strength thereof was 40 MPa.

Examples 8 to 11

Figure 6:
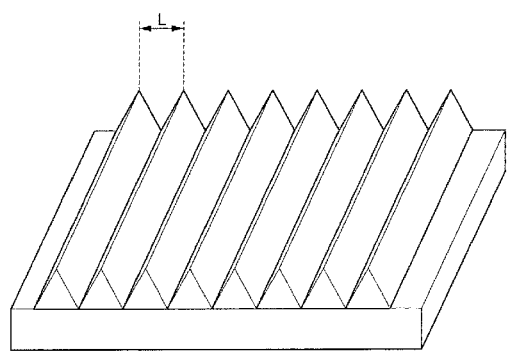
FIG. 6 is a view illustrating an embossing pattern of the pressure roll carrying an embossing design used in Examples 8 to 11.

In Examples 8 to 11, a film was embossed in a manner similar to Examples 4 to 7, except that the pressure roll used was an emboss roll carrying a rough-textured design having an local apex distance L of 5 μm in the flow direction, which extended to the roll terminal (see FIG. 6).

Evaluation results of the films obtained are summarized in "Table 3". The film storage modulus at a temperature of 30° C. was $3.3 \times 10^8$ Pa. The average distances thereof between the local apexes of the film after processing in the direction A were 5.2 to 5.4 μm, while the average distances thereof between the local apexes in the direction B were 25.2 to 35.1 μm, and the differences (absolute values) were 20.0 to 29.7 μm. The hand tearability thereof was "superior" or "favorable" and the linear cutting efficiency was "favorable" after evaluation. The tensile breaking strengths of the films obtained in Examples 8 to 11 were respectively 48, 46, 42 and 40 MPa.

TABLE 3

| | | Example | | | |
|---|---|---|---|---|---|
| | | 8 | 9 | 10 | 11 |
| Film | — | LC-2 | Pylen-OT | Emblem | Emblet PC |
| Storage modulus | Pa | $3.3 \times 10^8$ | $8.8 \times 10^8$ | $4.2 \times 10^9$ | $2.8 \times 10^9$ |
| Roll temperature | ° C. | 30 | 70 | 80 | 80 |
| Roll linear pressure | kg/cm | 10 | 10 | 100 | 200 |
| Average distance between local apexes in any one direction (A) | μm | 5.2 | 5.3 | 5.3 | 5.4 |
| Average distance between local apexes in direction perpendicular to direction (B) | μm | 25.2 | 27.7 | 29.6 | 35.1 |
| Difference: (A)-(B) | μm | 20 | 22.4 | 24.3 | 29.7 |
| Hand tearability | — | Superior | Superior | Superior | Superior |
| Organoleptic evaluation of hand tearability | — | Favorable | Favorable | Favorable | Favorable |
| Organoleptic evaluation of linear cutting efficiency | — | Favorable | Favorable | Favorable | Favorable |

Comparative Example 6

A film was embossed in a manner similar to Example 4, except that a polyethylene film produced by TAMAPOLY CO., LTD. (trade name: LC-2) was fed into the slit between two pressure rolls previously adjusted to a temperature of 110° C. and a linear pressure of 330 kg/cm.

Evaluation results of the film obtained are summarized in "Table 4". The film storage modulus at a temperature of 110° C. was $3.2 \times 10^7$ Pa. The average distance between the local apexes of the film after processing in the direction A was 9.8 μm, while the average distance between the local apexes in the direction B was 9.7 μm, and the difference was 0.1 μm. The hand tearability and the linear cutting efficiency were "unfavorable" after evaluation. The tensile breaking strength thereof was 71 MPa.

TABLE 4

| | | Comparative Example | | | |
|---|---|---|---|---|---|
| | | 6 | 7 | 8 | 9 |
| Film | — | LC-2 | Pylen-OT | Emblem | Emblet PC |
| Storage modulus | Pa | $3.2 \times 10^7$ | $8.8 \times 10^7$ | $8.7 \times 10^9$ | $2.5 \times 10^{10}$ |
| Roll temperature | ° C. | 110 | 160 | 40 | 60 |
| Roll linear pressure | kg/cm | 330 | 330 | 10 | 3 |
| Average distance between local apexes in any one direction (A) | μm | 9.8 | 10.0 | 8.5 | 11.2 |
| Average distance between local apexes in direction perpendicular to direction (B) | μm | 9.7 | 10.5 | 8.8 | 11.5 |
| Difference: (A)-(B) | μm | 0.1 | 0.5 | 0.3 | 0.3 |
| Hand tearability | — | Unfavorable | Unfavorable | Good | Unfavorable |

TABLE 4-continued

| | Comparative Example | | | |
|---|---|---|---|---|
| | 6 | 7 | 8 | 9 |
| Organoleptic evaluation of hand tearability | — | Unfavorable | Unfavorable | Good | Unfavorable |
| Organoleptic evaluation of linear cutting efficiency | — | Unfavorable | Unfavorable | Unfavorable | Unfavorable |

Comparative Example 7

A film was embossed in a manner similar to Example 5, except that a biaxial drawn polypropylene film manufactured by TOYOBO CO., LTD. (trade name: Pylen OT P4748) was fed into the slit between two pressure rolls previously adjusted to a temperature of 160° C. and a linear pressure of 330 kg/cm.

It was found after evaluation of the film obtained that the film storage modulus at a temperature of 160° C. was $8.8 \times 10^7$ Pa. The average distance between the local apexes of the film after processing in the direction A was 10.0 μm, while the average distance between the local apexes in the direction B was 10.5 μm, and the difference (absolute value) was 0.5 μm. The hand tearability and the linear cutting efficiency were "unfavorable" after evaluation. The tensile breaking strength thereof was 72 MPa.

Comparative Example 8

A film was embossed in a manner similar to Example 6, except that a nylon film produced by UNITIKA LTD. (trade name: Emblem ON) was fed into the slit between two pressure rolls adjusted to a temperature of 40° C. and a linear pressure of 10 kg/cm.

It was found after evaluation of the film obtained that the film storage modulus at a temperature of 40° C. was $8.7 \times 10^9$ Pa. The average distance between the local apexes of the film after processing in the direction A was 8.5 μm, while the average distance between the local apexes in the direction B was 8.8 μm, and the difference (absolute value) was 0.3 μm. The hand tearability was "good" after evaluation. On the other hand, the linear cutting efficiency was "unfavorable" after evaluation. The tensile breaking strength thereof was 63 MPa.

Comparative Example 9

A film was embossed in a manner similar to Example 7, except that a PET film produced by UNITIKA LTD. (trade name: Emblet PC) was fed into the slit between two pressure rolls adjusted to a temperature of 60° C. and a linear pressure of 3 kg/cm.

It was found after evaluation of the film obtained that the film storage modulus at a temperature of 60° C. was $2.5 \times 10^{10}$ Pa. The average distance between the local apexes of the film after processing in the direction A was 11.2 μm, while the average distance between the local apexes in the direction B was 11.5 μm, and the difference (absolute value) was 0.3 μm. The hand tearability and the linear cutting efficiency were "unfavorable" after evaluation. The tensile breaking strength thereof was 73 MPa.

Industrial Applicability

The film and the laminate according to the present invention can be used favorably, for example, in applications such as food packaging, asphalt and bags such as teabag. In addition, the adhesive tape according to the present invention can be used favorably, for example, for corrugated board packaging, curing, masking, medical application and electric insulation.

Brief Description Of Numerals
1 Film (bag)
2 Film (bag)
3 Film (pillow bag)
11, 21 and 31 Irregularly surfaced region
S Test film
D Jig

The invention claimed is:
1. A high density polyethylene film, having an average distance between local apexes in any one direction of 8 μm or less, wherein the difference between the average distance between the local apexes in any one direction and the average distance between the local apexes in the direction perpendicular thereto is 3.3 μm or more.
2. An adhesive tape, comprising the film according to claim 1 and an adhesive layer formed at least on one side thereof.
3. A laminate, comprising the film according to claim 1.
4. An adhesive tape, comprising the laminate according to claim 3 and an adhesive layer formed at least on one side thereof.

* * * * *